(12) United States Patent
Chen et al.

(10) Patent No.: US 11,881,588 B2
(45) Date of Patent: Jan. 23, 2024

(54) SECONDARY BATTERY AND BATTERY MODULE

(71) Applicant: Contemporary Amperex Technology Co., Limited, Ningde (CN)

(72) Inventors: Yuanbao Chen, Ningde (CN); Rui Yang, Ningde (CN); Haizu Jin, Ningde (CN); Dongyang Shi, Ningde (CN); Ning Chen, Ningde (CN); Quankun Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/352,352

(22) Filed: Jun. 20, 2021

(65) Prior Publication Data

US 2021/0313661 A1 Oct. 7, 2021

Related U.S. Application Data

(63) Continuation of application No. PCT/CN2019/076281, filed on Feb. 27, 2019.

(30) Foreign Application Priority Data

Dec. 29, 2018 (CN) .......................... 201811646824.0

(51) Int. Cl.
*H01M 50/538* (2021.01)
*H01M 50/209* (2021.01)
(Continued)

(52) U.S. Cl.
CPC ....... *H01M 50/186* (2021.01); *H01M 50/209* (2021.01); *H01M 50/533* (2021.01); *H01M 50/538* (2021.01)

(58) Field of Classification Search
CPC ............. H01M 50/531; H01M 50/538; H01M 50/103; H01M 50/15; H01M 50/186;
(Continued)

(56) References Cited

U.S. PATENT DOCUMENTS

| 2011/0129720 A1* | 6/2011 | Yun | ...................... | H01M 50/538 |
| | | | | 429/159 |
| 2011/0244314 A1* | 10/2011 | Lee | ...................... | H01M 50/538 |
| | | | | 429/163 |

(Continued)

FOREIGN PATENT DOCUMENTS

| CN | 105609882 | 5/2016 |
| CN | 206650130 U | 11/2017 |

(Continued)

OTHER PUBLICATIONS

Machine translation of CN 105609882, published May 25, 2016. (Year: 2016).*

(Continued)

*Primary Examiner* — Stewart A Fraser
*Assistant Examiner* — Lilia Nedialkova
(74) *Attorney, Agent, or Firm* — East IP P.C.

(57) ABSTRACT

The present application relates to a secondary battery and a battery module. The secondary battery comprises: a casing, which is provided with an accommodating hole with an opening; a top cover assembly, which is in sealed connection with the casing to close the opening; an electrode assembly, which is arranged in the accommodating hole, and comprises two end faces opposite to a first direction perpendicular to an axial direction of the accommodating hole, and tabs extending from the end faces, the electrode assembly comprises two or more electrode units, wherein two or more electrode units are stacked in the axial direction, and in a second direction perpendicular to the axial direction and the (Continued)

first direction, the size of the tabs is smaller than that of the end faces; and a current collector, which comprises a body portion.

11 Claims, 9 Drawing Sheets

(51) Int. Cl.
  *H01M 50/533* (2021.01)
  *H01M 50/186* (2021.01)
(58) Field of Classification Search
  CPC ............. H01M 50/209; H01M 50/528; H01M 50/533; H01M 10/0431; Y02E 60/10; Y02P 70/50
  See application file for complete search history.

(56) References Cited

U.S. PATENT DOCUMENTS

| | | | |
|---|---|---|---|
| 2012/0196166 A1* | 8/2012 | Kim | H01M 50/528 429/94 |
| 2014/0349149 A1* | 11/2014 | Kim | H01M 50/50 429/61 |
| 2015/0079431 A1* | 3/2015 | Kim | H01M 50/531 429/61 |
| 2019/0067664 A1* | 2/2019 | Kwak | H01M 50/148 |
| 2021/0175567 A1* | 6/2021 | Kim | H01M 50/545 |

FOREIGN PATENT DOCUMENTS

| | | |
|---|---|---|
| CN | 108198989 A | 6/2018 |
| KR | 20080074239 | 8/2008 |

OTHER PUBLICATIONS

The International Search Report for PCT Application No. PCT/CN2019/076281, dated Oct. 8, 2019, 11 pages.

The partial supplementary European search report dated Dec. 22, 2021 for European application No. 19905886.8, 15 pages.

The extended European search report for European Application No. 19905886.8, dated Mar. 22, 2022, 13 pages.

* cited by examiner

SECONDARY BATTERY AND BATTERY MODULE

CROSS REFERENCE

The present disclosure is a continuation of International Application No. PCT/CN2019/076281, filed on Feb. 27, 2019, which claims priority to Chinese patent application No. 201811646824.0, titled "Secondary Battery and Battery Module" filed on Dec. 29, 2018, both of which are hereby incorporated by reference in their entireties.

TECHNICAL FIELD

The present disclosure relates to the technical field of battery technology, in particular to a secondary battery and a battery module.

BACKGROUND

With development of science and technology, secondary batteries have been widely used in portable electronic devices, such as mobile phones, digital cameras, and laptop computers, and have a wide range of application prospects in electric transports, such as electric vehicles and electric bicycles, and energy storage facilities and other large and medium-sized electric equipment. It has become an important technical means to solve global problems, such as energy crisis and environmental pollution. In the prior art, a secondary battery includes a housing, an electrode assembly disposed in the housing, and a current collector connected with the electrode assembly. The electrode assembly has a flat body and a pole tab extending from the body. In the prior art, the current collector can be disposed at an end of the pole tab and fixedly connected with the end of the tab. However, the current collector itself occupies space between the pole tabs and the housing, which makes a size of the secondary battery larger and affects an energy density of the secondary battery.

SUMMARY

Embodiments of the present disclosure provide a secondary battery and a battery module. A main body of a current collector and pole tabs in the secondary battery are disposed side by side, thereby reducing an occupancy rate of space between an electrode unit and a housing, which is beneficial to increasing an energy density.

In an aspect, an embodiment of the present disclosure provides a secondary battery, comprising:
 a housing comprising a receiving hole with an opening; a top cover assembly hermetically connected with the housing to close the opening; an electrode assembly disposed in the receiving hole, and comprising two end faces opposite to each other in a first direction perpendicular to an axial direction of the receiving hole and a pole tab extending from one of the end faces, wherein the electrode assembly comprises two or more electrode units stacked along the axial direction, and a size of the pole tab is smaller than a size of each of the end faces along a second direction perpendicular to the axial direction and the first direction; a current collector comprising a main body at least partially located between one of the end faces and the housing, wherein the main body extends along the axial direction and is electrically connected with the pole tab, and the main body and the pole tab are at least partially overlapped along the second direction.

The secondary battery provided according to an embodiment of the present disclosure includes the housing, the electrode assembly disposed in the housing, and the top cover assembly hermetically connected with the housing. The electrode assembly has two opposite end faces in the first direction and the pole tab extending from each of the end faces. Since in this embodiment, the size of the pole tab in the second direction is smaller than the size of each of the end faces along the second direction. That is, in the second direction, the pole tab is narrower than the end faces, the pole tab can give way to more avoidance space in the second direction, so that the main body included in the current collector and the pole tab of this embodiment can be disposed side by side in the second direction. And the main body and the pole tab are at least partially overlapped in the second direction. Since the main body and the pole tab are disposed side by side in the second direction, space occupied by the main body in the first direction is significantly reduced, which is beneficial to increasing energy density of the secondary battery.

In another aspect, an embodiment of the present disclosure provides a battery module comprising two or more secondary batteries according to the above embodiment, and the two or more secondary batteries are disposed side by side.

BRIEF DESCRIPTION OF THE DRAWINGS

Below, features, advantages, and technical effects of an exemplary embodiment of the present disclosure will be described with reference to the drawings.

Figure 1:
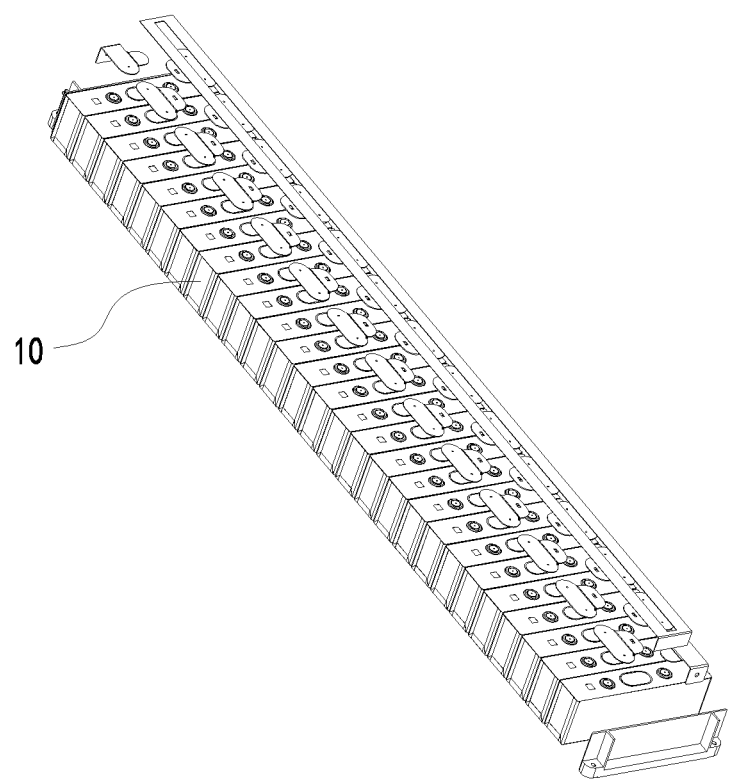
FIG. 1 is a schematic structural diagram of a battery module according to an embodiment of the present disclosure.

In the drawings, the drawings are not drawn to scale.

DESCRIPTION OF REFERENCE SIGNS

10. secondary battery; 11, housing; 11*a*, receiving hole; 12, top cover assembly; 121, top cover plate; 122, pole post; 13, electrode assembly; 13a, end face; 130a, first area; 130b, second area; 130c, third area; 13b, pole tab; 131, electrode unit; 131a, sub-end face; 131b, sub-pole tab; 131c, wide surface; 131d, narrow surface; 14, current collector; 14a, current collecting sheet; 141, main body; 142, transition portion; X, axial direction; Y, first direction; Z, second direction; 20, battery module.

DETAILED DESCRIPTION

Below, embodiments of the present disclosure will be further described in detail with reference to accompanying drawings and embodiments. The detailed description of the embodiments and the accompanying drawings are intended to illustrate the principles of the present disclosure and are not intended to limit the scope of the present disclosure.

In the description of the present disclosure, it should be noted that, unless otherwise stated, the meaning of "a plurality" and the like is two or more; the orientation or positional relationship indicated by the terms "upper", "lower", "left", "right", "inside", "outside" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", "third" and the like are used for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a detachable connection, or an integral connection; they can be connected directly or indirectly through an intermediate medium. The specific meaning of the above terms in the present disclosure can be understood by those skilled in the art according to actual circumstance.

In order to better understand the present disclosure, a battery module 20 and a secondary battery 10 according to embodiments of the present disclosure will be described in detail below with reference to FIGS. 1 to 10.

As shown in FIG. 1, an embodiment of the present disclosure provides a battery module 20 including: two or more secondary batteries 10 of this embodiment and a bus bar for connecting two secondary batteries 10. Two or more secondary batteries 10 are disposed side by side in the same direction. One end of the bus bar is connected and fixed to one of the two secondary batteries 10, and the other end is connected and fixed to the other secondary battery 10. The two or more secondary batteries 10 of this embodiment can be disposed side by side along their own thickness direction to form the battery module 20.

Figure 2:
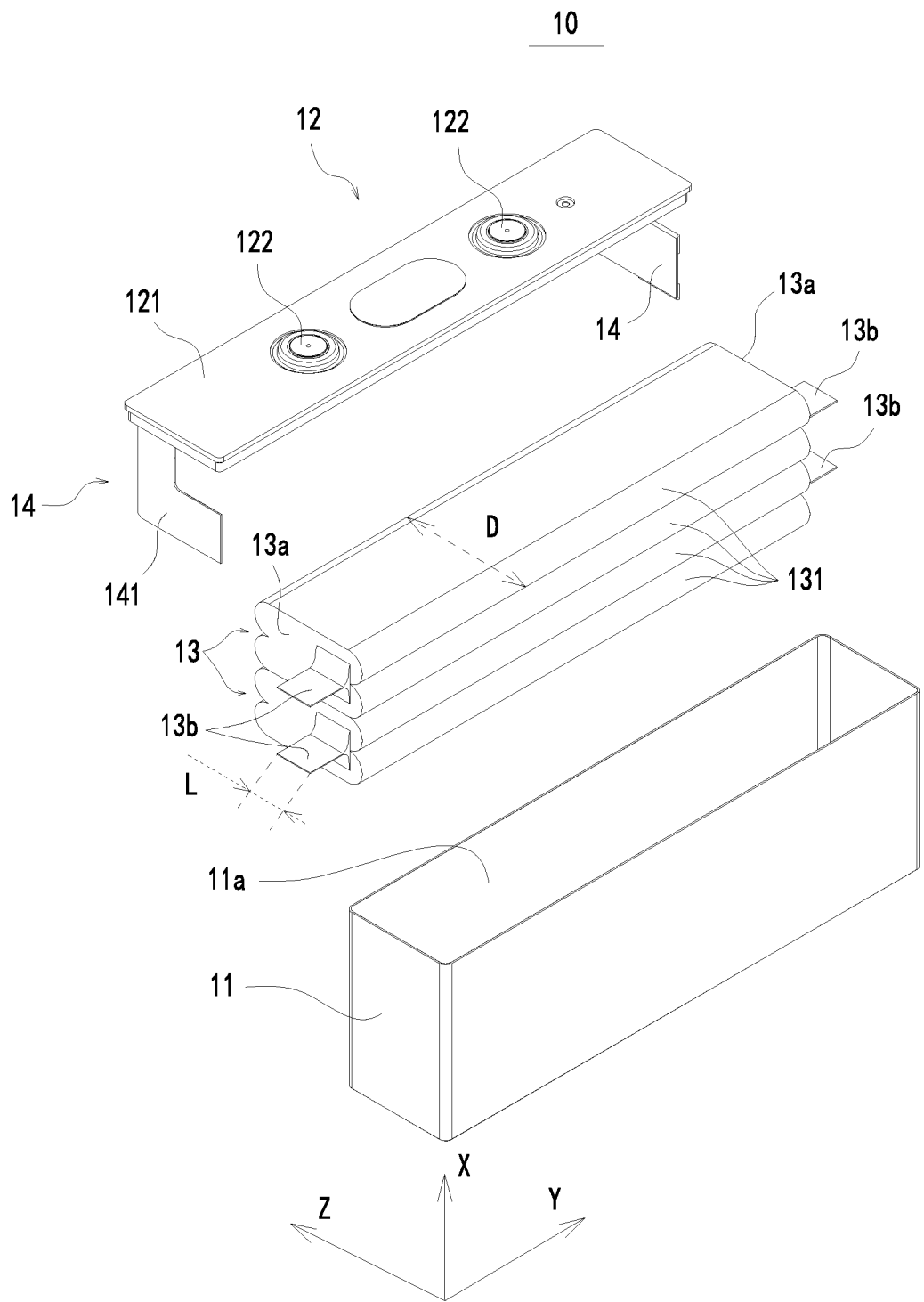
FIG. 2 is a schematic exploded structural diagram of a secondary battery according to an embodiment of the present disclosure.

Referring to FIG. 2, the secondary battery 10 of the embodiment of the present disclosure includes a housing 11, an electrode assembly disposed in the housing 11, and a top cover assembly 12 hermetically connected to the housing 11.

The housing 11 of this embodiment may be in a shape of a quadrangular prism or other shapes. The housing 11 includes a receiving hole 11a with an opening. The receiving hole 11a is used to receive the electrode assembly 13 and electrolyte. The housing 11 may be made of materials such as aluminum, aluminum alloy, or plastic.

The electrode assembly 13 of the embodiment of the present disclosure includes two end faces 13a opposite to each other in a first direction Y perpendicular to an axial direction X of the receiving hole 11a, and a pole tab 13b extending from each end face 13a. The axial direction X and an extending direction of the receiving hole 11a are the same. In this embodiment, one pole tab 13b extends from each end face 13a of the electrode assembly 13. Each electrode assembly 13 includes two pole tabs 13b opposite to each other along the first direction Y. One pole tab 13b is used as a positive pole tab and the other is used as a negative pole tab.

Figure 3:
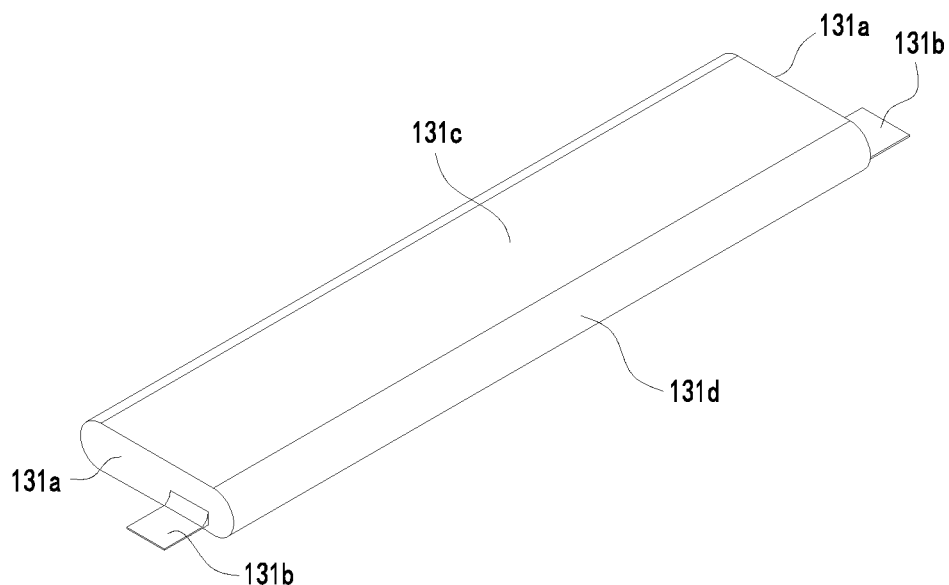
FIG. 3 is a schematic structural diagram of an electrode unit according to an embodiment of the present disclosure.
Figure 4:
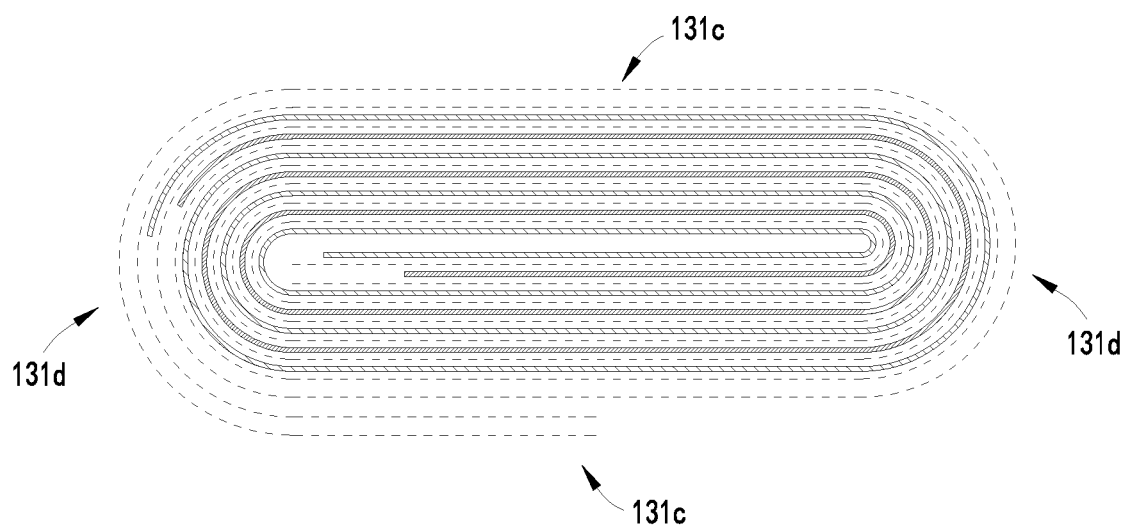
FIG. 4 is a schematic cross-sectional structural diagram of an electrode unit according to an embodiment of the present disclosure.

Referring to FIGS. 3 and 4, the electrode assembly 13 of this embodiment includes two or more electrode units 131 stacked along the axial direction X of the receiving hole 11a. The electrode unit 131 includes a sub-end face 131a and a sub-pole tab 131b extending from the sub-end face 131a. A body of the electrode unit 131 and a sub-pole tab 131b connected to the body this embodiment can be formed by a stacking or winding of a first pole piece, a second pole piece, and an insulating film together. The insulating film is provided as an insulator between the first pole piece and the second pole piece. The electrode unit 131 of this embodiment includes one insulating film, one first pole piece, one insulating film and one second pole piece. In this embodiment, the first pole piece is exemplarily described as a positive pole piece and the second pole piece is a negative pole piece. Similarly, in other embodiments, the first pole piece may also be a negative pole piece, and the second pole piece is a positive pole piece. In addition, positive electrode active material is coated on a coating area of the positive pole piece, and negative electrode active material is coated on a coating area of the negative pole piece. Multiple uncoated areas extending from the main body serve as the sub-pole tabs 131b. Each electrode unit 131 includes two sub-pole tabs 131b arranged opposite to each other along the first direction Y, namely, a positive pole tab and a negative pole tab. The positive pole tab extends from the coating area of the positive pole piece; the negative pole tab extends from the coating area of the negative pole piece. The first direction Y is perpendicular to the axial direction X. The term "perpendicular to" here is not limited to a strict perpendicular definition in a mathematical sense. The end face 13a of each electrode assembly 13 includes the sub-end face 131a of each electrode unit 131, that is, all the sub-end faces 131a of all the electrode units 131 collectively form the end face 13a. The pole tab 13b of each electrode assembly 13 includes the sub-pole tabs 131b of each electrode unit 131, that is, all the sub-pole tabs 131b of all the electrode units 131 together form the pole tab 13b. In one embodiment, referring to FIG. 4, the electrode unit 131 is a flat structure with two wide surfaces 131c and two narrow surfaces 131d connecting the two wide surfaces 131c. The two wide surfaces 131c are arranged opposite to each other along the axial direction X. One wide surface 131c and one narrow surface 131d are alternately arranged.

The top cover assembly 12 of this embodiment is connected to the housing 11 in a hermetical manner to cover the opening. In one embodiment, the top cover assembly 12 includes a top cover plate 121 and a pole post 122. The top cover assembly 12 is hermetically connected to the housing 11 via the top cover plate 121. The pole post 122 is disposed on the top cover plate 121 and is electrically connected to the electrode assembly 13 through the current collector 14.

In the embodiment of the present disclosure, referring to FIG. 2, in the second direction Z perpendicular to the axial direction X and the first direction Y, a size L of the pole tab 13b is smaller than a size D of the end face 13a. That is, in the second direction of Z, the pole tab 13b of this embodiment is narrower than the end face 13a. The current collector 14 of this embodiment includes a main body 141, at least part of which is located between the end face 13a and a side wall of the housing 11, and the main body 141 extends in the axial direction X and is electrically connected with the pole tab 13b. In the second direction Z, the main body 141 and the pole tab 13b are at least partially overlapped. Since the size of the pole tab 13b in the second direction Z in this embodiment is smaller than the size of the end face 13a in the second direction Z, a larger avoidance space can be reserved in the second direction Z. Therefore, at least a part of the main body 141 of the embodiment is disposed in the avoidance space and overlaps with the pole tab 13b in the second direction Z, so that the main body 141 does not occupy too much space formed between the end face 13a of the electrode assembly 13 and the housing 11 in the first direction Y, which is beneficial to increasing energy density of the secondary battery 10.

Since the size L of the pole tab 13b of this embodiment is smaller than the size D of the end face 13a, the pole tab is easily to be bent and can give way sufficient space for the main body 141 in the second direction Z.

Figure 5:
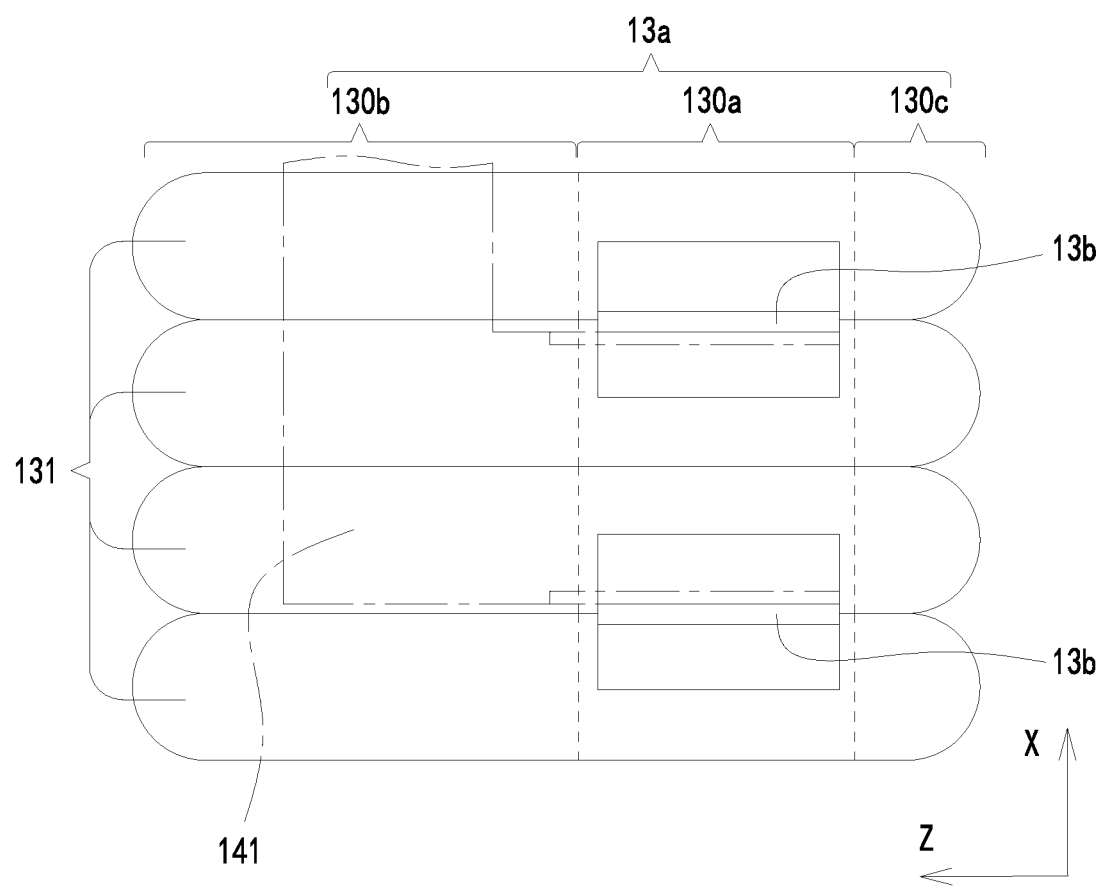
FIG. 5 is a schematic structural side view of an electrode assembly according to an embodiment of the present disclosure.

In one embodiment, referring to FIG. 5, in the second direction Z, the end face 13a includes a first area 130a and a second area 130b. The pole tab 13b extends from the first area 130a. The second area 130b is located on one side of the first area 130a. A portion of the main body 141 located between the end face 13a and the housing 11 is opposite to the second area 130b. Optionally, in this embodiment, as shown in FIG. 8, in the second direction Z, a sum of a size H of the main body 141 and the pole tab 13b (see FIG. 8) is smaller than the size D of the end face 13a (see FIG. 2), so as to ensure that the current collector 14 as a whole will not go beyond an edge of the electrode unit 131 in the second direction Z, so as to reduce the space occupied by the current collector 14 in the second direction Z and effectively improve the energy density of the secondary battery 10.

In an embodiment, in the second direction Z, the end face 13a further includes a third area 130c. The third area 130c is located on the other side of the first area 130a. That is, the third area 130c and the second area 130b are respectively located on two sides of the first area 130a, so that the pole tab 13b extending from the first area 130a in this embodiment is a die-cut pole tab and its cross section is approximately rectangular or approximately trapezoidal. Therefore, compared to the pole tab 13b with the cross section having an arc-shaped area, the pole tab 13b of this embodiment has a good ability to be bent along the axial direction X, and the pole tab 13b will not be broken or torn caused by stress concentration when the arc-shaped area is bent. In addition, a size of the third area 130c is smaller than a size of the second area 130b, so that a position of the pole tab 13b of the present embodiment is closer to one narrow surface 131d than the other narrow surface 131d, and thus the main body 141 can have a larger size. In particular, when the size of the electrode assembly 13 in the second direction Z is relatively small, it is more necessary to ensure the size of the main body 141 in the second direction Z to increase its flow capacity. In one embodiment, the main body 141 has a plate-shaped structure. The pole tab 13b can be folded along the first direction Y and connected to a surface of the main body 141 facing away from the electrode unit 131, so that the pole tab 13b can be directly connected to the main body 141. Optionally, the pole tab 13b can be folded along the second direction Z and connected to the main body 141, or can be folded along the axial direction X and connected to the main body 141.

Figure 6:
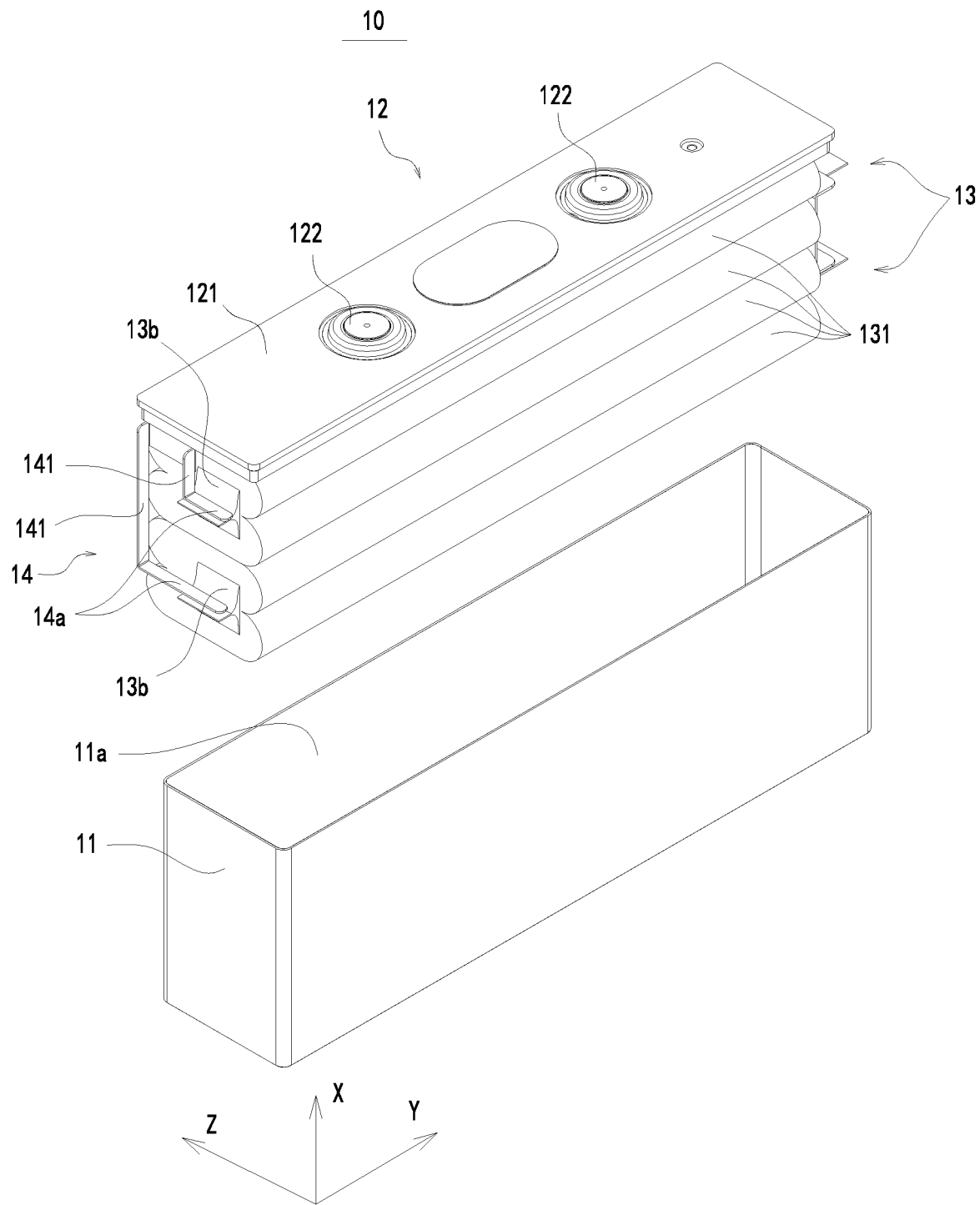
FIG. 6 is a schematic exploded structural diagram of a secondary battery according to another embodiment of the present disclosure.
Figure 7:
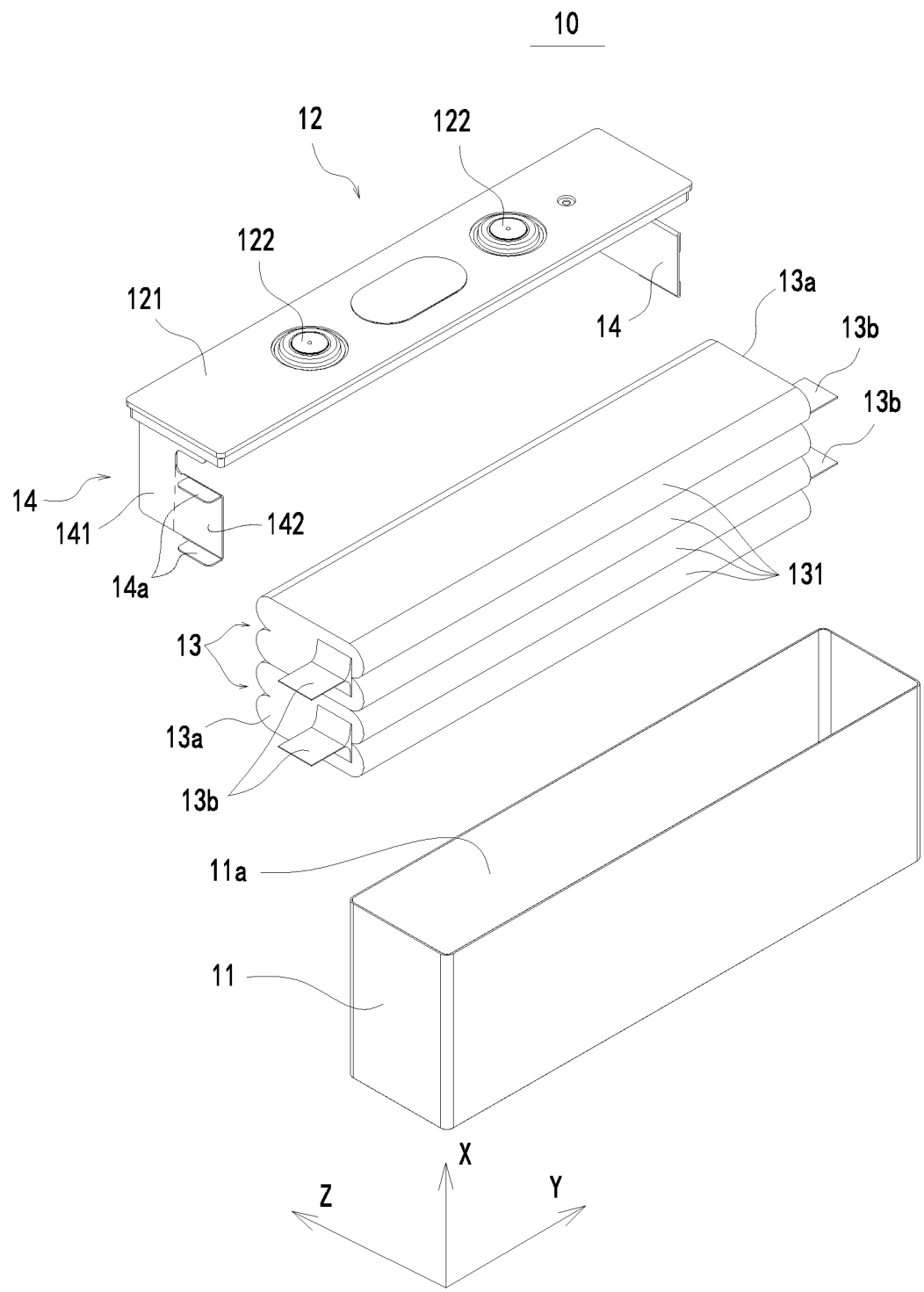
FIG. 7 is a schematic exploded structural diagram of a secondary battery according to another embodiment of the present disclosure.

As shown in FIG. 6 and FIG. 7, the current collector 14 of this embodiment further includes a current collecting sheet 14a. The current collecting sheet 14a is connected to the main body 141. The pole tab 13b is connected to the main body 141 via the current collecting sheet 14a. The current collecting sheet 14a is used to be connected and fixed with the pole tab 13b, and both are located on the same side of the main body 141 along the second direction Z, so that a part of the current collecting sheet 14a and the pole tab 13b are overlapped in the axial direction X, effectively reducing space occupied by the current collecting sheet 14a in the second direction Z, which is beneficial to increasing the energy density of the secondary battery 10 and improve the flow capacity of the current collecting sheet 14a at the same time. The current collecting sheet 14a is disposed on the main body 141 of the current collector 14, which facilitates a welding connection of the pole tab 13b and the current collecting sheet 14a via welding equipment, and reduces welding difficulty. Optionally, the current collecting sheet 14a and the pole tab 13b are welded and connected by means of ultrasonic welding. For example, the current collecting sheet 14a of this embodiment is a sheet-like structure with a predetermined thickness.

Figure 8:
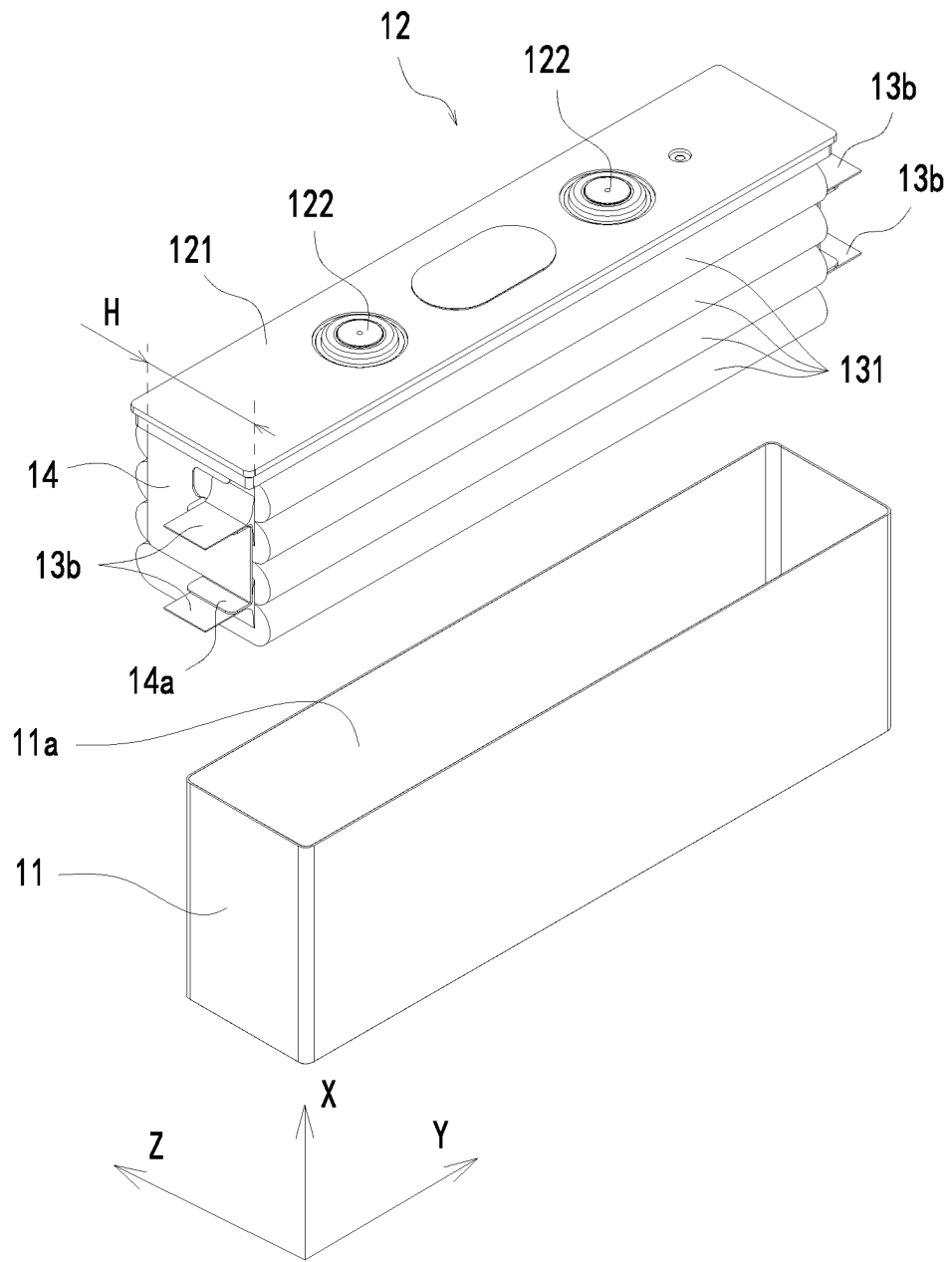
FIG. 8 is a schematic diagram of a connection structure of a current collector and an electrode assembly of the secondary battery in the embodiment of FIG. 7.

In an embodiment, referring to FIGS. 7 and 8, the thickness direction of the current collecting sheet 14a is parallel to the axial direction X. The current collecting sheet 14a extends from the main body 141 toward the housing 11. In an example, the pole tab 13b can be connected to a surface of the current collecting sheet 14a facing the top cover assembly 12. The surface of the current collecting sheet 14a facing the top cover assembly 12 and a surface of the pole tab 13b facing the current collecting sheet 14a are basically in the same plane, so that the pole tab 13b can be connected and fixed with the current collecting sheet 14a without bending, and the possibility of breaking or tearing due to bending of the pole tab 13b itself is lowered. At the same time, since there is larger space on opposite sides in the axial direction X of the current collecting sheet 14a, it is convenient to use welding equipment to clamp the current collecting sheet 14a from opposite sides of the current collecting sheet 14a and weld and connect the pole tab 13b and the current collecting sheet 14a, which effectively reduces operation difficulty during the welding and connection process.

Figure 9:
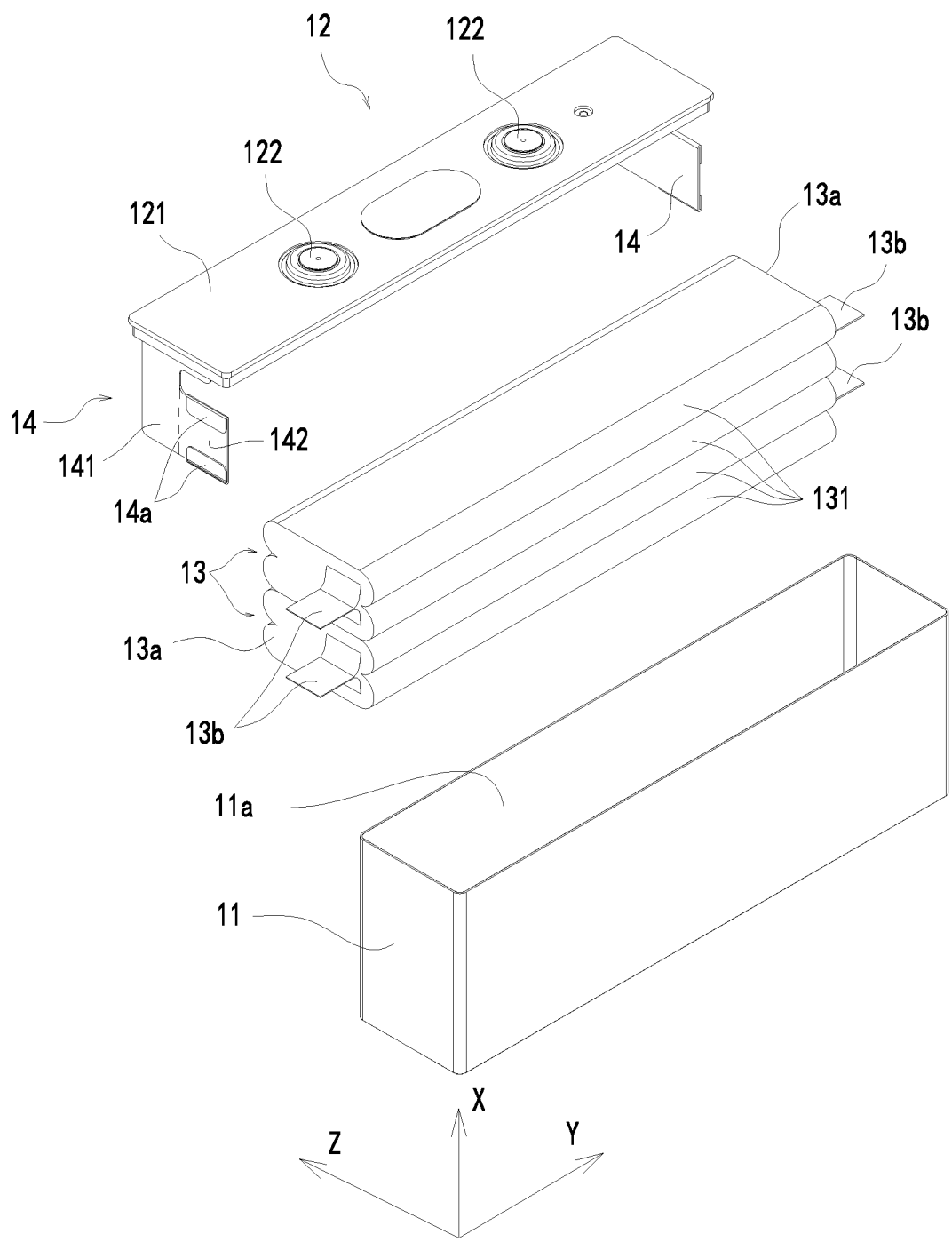
FIG. 9 is a schematic exploded structural diagram of a secondary battery according to still another embodiment of the present disclosure.
Figure 10:
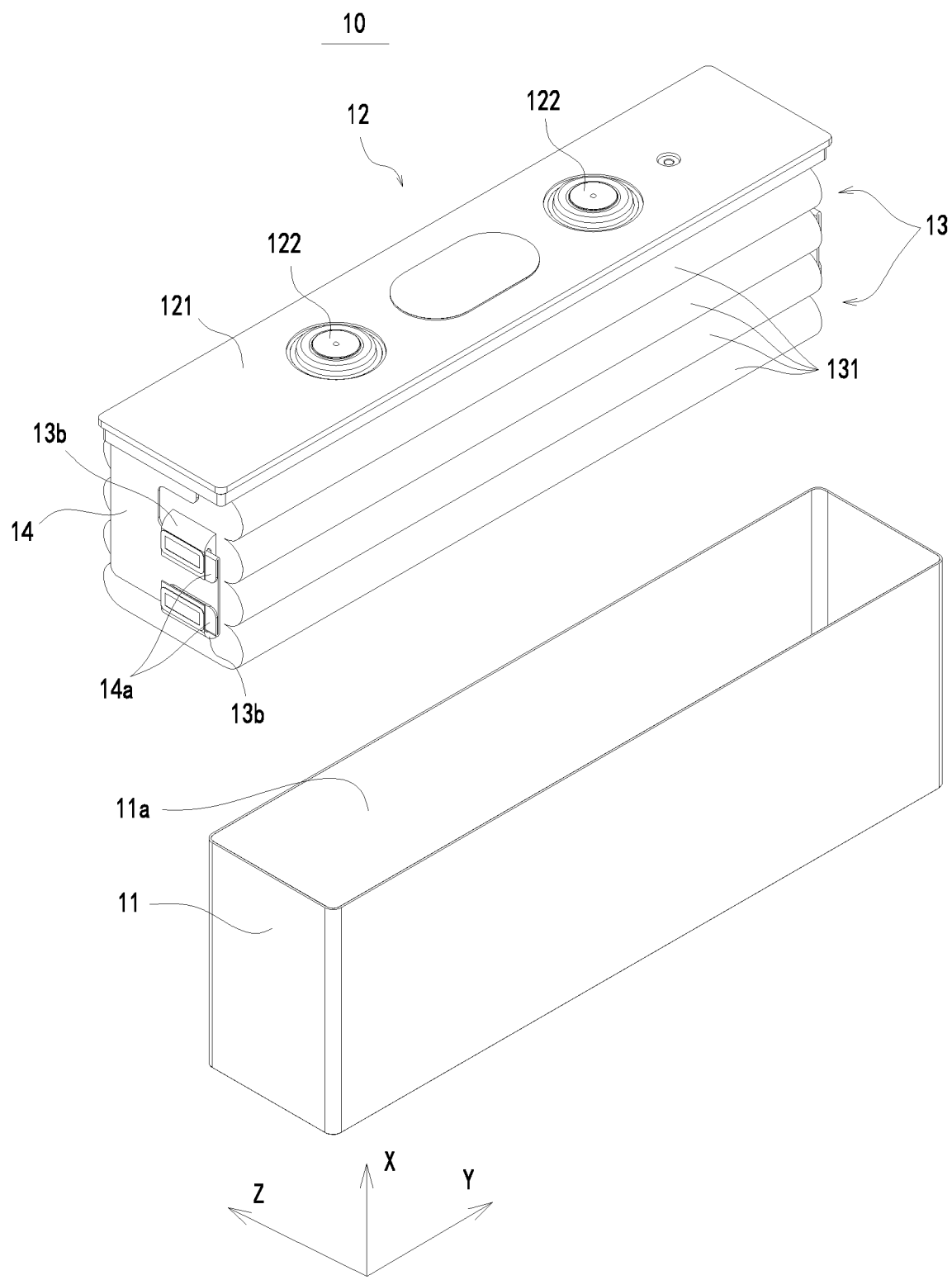
FIG. 10 is a schematic diagram of a connection structure of a current collector and an electrode assembly of the secondary battery in the embodiment of FIG. 9.

In another embodiment, referring to FIGS. 9 and 10, the thickness direction of the current collecting sheet 14a is parallel to the first direction Y. Two opposite surfaces of the current collecting sheet 14a along the first direction Y have a relatively large area, and both can be connected and fixed with the pole tab 13b. In one example, the pole tab 13b is bent in the first direction Y, and is connected and fixed with the surface of the current collecting sheet 14a facing away from the end face 13a, so that the current collecting sheet 14a protects the electrode assembly 13 and a free end of the pole tab 13b will not be folded during installation or later use to contact the end face 13a of the electrode assembly 13, thereby reducing a possibility that the pole tab 13b is folded and inserted into the end face 13a to cause structural damage or breakage of the electrode unit 131. The current collecting sheet 14a can be welded and connected to the pole tab 13b with its thickness direction parallel to the axial direction X. Then the current collecting sheet 14a is bent in the first direction Y, and the thickness direction of the current collecting sheet 14a and the first direction Y are made to be parallel. In this way, the size of the current collecting sheet 14a in the thickness direction is small, so that space formed between the electrode assembly 13 and the housing 11 occupied by the current collector is less, and the energy density of the secondary battery 10 is effectively improved.

In one embodiment, referring to FIG. 6, the current collecting sheet 14a can be directly connected to the main body 141. The pole tab 13b is connected to the main body 141 via the current collecting sheet 14a. The current collecting sheet 14a of this embodiment intersects the main body 141. Optionally, the main body 141 is a strip structure extending in the axial direction X, and the current collecting sheet 14a extends in the second direction Z and is perpendicular to the main body 141. The pole tab 13b can be connected to the surface of the current collecting sheet 14a facing the top cover assembly 12 or facing away from the top cover assembly 12.

In one embodiment, referring to FIG. 7 or FIG. 9, the current collector 14 further includes a transition portion 142. The transition portion 142 extends in the second direction Z and towards an outside of the main body 141. The current collecting sheet 14a is connected to an edge of the transition portion 142 in the axial direction X. The main body 141 of the current collector 14 is located on one side of the pole tab 13b in the second direction Z, and the transition portion 142 and the pole tab 13b are at least partially overlapped in the axial direction X. The current collecting sheet 14a is disposed on an area of the transition portion 142 corresponding to the pole tab 13b. The transition portion 142 is used for a transitional connection between the current collecting sheet 14a and the main body 141, which is beneficial to improving the flow capacity between the current collecting sheet 14a and the main body 141. In one embodiment, the main body 141 and the transition portion 142 have an L-shaped structure.

In one embodiment, a number of electrode assemblies 13 is set as two. The two sets of electrode assemblies 13 are stacked in the axial direction X. A number of current collecting sheets 14a is set as two. The two current collecting sheets 14a are disposed to be spaced apart along the axial direction X. The pole tabs 13b of one set of electrode assembly 13 and the pole tabs 13b of the other set of electrode assembly 13 are respectively connected to both current collecting sheets 14a. In this embodiment, two current collecting sheets 14a are used to connect the pole tabs 13b with the same polarity of the two sets of electrode assemblies 13 to realize current collection. In this way, on one hand, temperature at a connecting position of the pole tab 13b and a first current collecting sheet 14a can be avoided to be too high when multiple electrode units 131 are connected to the first current collecting sheet 14a via one pole tab 13b, and occurrence of faulty welding is avoided to a certain extent. On the other hand, the pole tab 13b extends to a short distance to be connected and fixed with the first current collecting sheet 14a or the second current collecting sheet 14a at a corresponding position, so that there is no need for the pole tab 13b to extend too long out of the end face 13a to be connected to the first current collecting sheet 14a. Therefore, the electrode unit 131 has a uniform processing size and a uniform processing procedure, thereby reducing processing and manufacturing difficulties and processing costs. Optionally, the two sets of electrode assemblies 13 are stacked in the axial direction X. Each electrode assembly 13 includes two electrode units 131. The electrode unit 131 has a sub-end face 131a and a sub-pole tab 131b extending from the sub-end face 131a. In the first direction Y, two sub-end faces 131a on the same side form the end face 13a of the electrode assembly 13. Two sub-tabs 131b with the same polarity converge to form the pole tab 13b of one electrode assembly 13. The sub-pole tab 131b of one electrode unit 131 extends from an area of the sub-end face 131a close to the other electrode unit 131 in the axial direction X, so that the respective sub-pole tabs 131b of the two electrode units 131 are close to each other and extend a short distance to converge to form the pole tab 13b to be connected and fixed with the current collector 14a. In this way, on one hand, the sub-pole tab 131b will not have length redundancy due to an excessive extension of itself. When the sub-pole tab 131b has the length redundancy, it is easy to cause a stress concentration area and thus a breakage of the sub-pole tab 131b when it is bent. On the other hand, the extension size of the sub-pole tab 131b is controlled within a small range, which is beneficial to reducing space occupancy rate of the pole tab 13b formed by converge of the sub-pole tabs 131b and improve the energy density of the secondary battery 10.

In one embodiment, the pole tab 13b of one set of electrode assembly 13 and the pole tab 13b of the other set of electrode assembly 13 are at least partially overlapped along the axial direction X. When the two pole tabs 13b are at least partially overlapped in the axial direction X, the space occupancy rate of the respective current collecting sheets 14a in the second direction Z can be reduced, which is beneficial to reducing the overall size and weight of the current collecting sheet and thereby beneficial to increasing the energy density of the secondary battery. Optionally, the two pole tabs 13b are completely overlapped in the axial direction X, that is, the two pole tabs 13b are aligned in the axial direction X. The current collecting sheets 14a respectively connected to the two pole tabs 13b are also aligned in the axial direction X, so the space occupation rate of the current collecting sheet 14a in the second direction Z is minimized.

The electrode unit 131 of this embodiment has two wide surfaces 131c and two narrow surfaces 131d connecting the two wide surfaces 131c. The two wide surfaces 131c are disposed opposite to each other along the axial direction X. One wide surface 131c and one narrow surface 131d are alternately disposed. The pole tab 13b extends from an area of the end face 13a close to two adjacent wide surfaces 131c of the two electrode units 131, so that the pole tab 13b is approximately in the central area of the end face 13a in the axial direction X, ensuring that the sizes of the two sub-pole tabs 131b leading out of the two electrode units 131 are approximately the same, which is beneficial to consistency of the processing and manufacturing process of the electrode unit 131 and reduces the processing and manufacturing cost. In one embodiment, a ratio of the size of the pole tab 13b to the size of the end face 13a is 1/10 to 2/5 in the second direction Z.

The battery module 20 of the embodiment of the present disclosure includes a plurality of secondary batteries 10 arranged side by side in the same direction. As the electrode units 131 included in each secondary battery 10 of this embodiment are stacked along the axial direction X of the receiving hole 11a of the housing 11, when the electrode unit 131 of this embodiment expands, it expands and deforms mainly along the axial direction X of the receiving hole 11a, and an amount of expansion in an arrangement direction of the secondary batteries 10 is small. In this way, a total expansion force accumulated in the arrangement direction of all the secondary batteries 10 is small. In the arrangement direction of the secondary batteries 10, the battery module 20 does not need to use higher-strength structural members to restrain and offset the expansion force, or use lower-strength structural members to restrain and offset the expansion force, thereby effectively reducing an overall weight of the battery module 20, making structure of the battery module 20 more compact, and effectively improving the energy density of the battery module 20. Moreover, the battery module 20 itself has little or no expansion in the thickness direction of the secondary battery 10 itself, which can effectively improve safety during use process.

Although the present disclosure has been described with reference to optional embodiments, various modifications can be made thereto and the components therein can be replaced with equivalents without departing from the scope of the present disclosure, especially as long as there is no structural conflict, the technical features mentioned in the embodiments can be combined in any way. The present disclosure is not limited to the specific embodiments disclosed herein, but includes all technical solutions falling within the scope of the claims.

What is claimed is:

1. A secondary battery, comprising:
    a housing comprising a receiving hole with an opening;
    a top cover assembly hermetically connected with the housing to close the opening;
    an electrode assembly disposed in the receiving hole, and comprising
        two end faces located on two sides of the electrode assembly and opposite to each other in a first direction perpendicular to an axial direction of the receiving hole, wherein for an end face selected from the two end faces, the end face comprises a first area and a second area, and
        a pole tab extending out of the first area of the end face, wherein the electrode assembly comprises two or more electrode units stacked along the axial direction, and along a second direction perpendicular to the axial direction and the first direction, a size of the pole tab is smaller than a size of the end face; and
    a current collector comprising a main body, wherein the main body is configured to be substantially parallel to the end face, and be at least partially located between the second area of the end face and the housing, and the main body is further configured to extend along the axial direction, be electrically connected with the pole tab, and at least partially overlap with the pole tab along the second direction,
    wherein each of the electrode units comprises two wide surfaces and two narrow surfaces connecting the two wide surfaces, and the two wide surfaces are opposed to each other in the axial direction, and one of the wide surfaces and one of the narrow surfaces are alternately disposed,
    the two narrow surfaces are arranged opposite to each other in the second direction, the opening of the housing is located at an end of the receiving hole in the axial direction,
    the current collector further comprises a transition portion and a current collecting sheet electrically connected with the main body, the transition portion is substantially parallel to the end face, extends along the second direction between the first area of the end face and the housing, the current collecting sheet is connected to an edge of the transition portion along the axial direction, wherein the current collecting sheet is configured to be connected and fixed with the pole tab, the transition portion, the current collecting sheet and the pole tab are located on the same side of the main body in the second direction, the current collecting sheet is foldable and is substantially parallel to the transition portion after folding, and the pole tab which has been bent along the first direction is connected and fixed to a surface of the current collecting sheet which has been bent away from the end face of the electrode assembly toward the transition portion.

2. The secondary battery according to claim 1, wherein the second area is located on one side of the first area in the second direction.

3. The secondary battery according to claim 2, wherein a sum of a size of the main body and the size of the pole tab is smaller than the size of the end face in the second direction.

4. The secondary battery according to claim 2, wherein the end face further comprises a third area located on the other side of the first area in the second direction, and a size of the third area is smaller than a size of the second area.

5. The secondary battery according to claim 1, wherein two electrode assemblies are provided, the two electrode assemblies are stacked along the axial direction, two current collecting sheets are provided, the two current collecting sheets are disposed to be spaced apart along the axial direction, the pole tab of one of the electrode assemblies and the pole tab of the other of the electrode assemblies are respectively connected with the two current collecting sheets, and the pole tab of the one of the electrode assemblies and the pole tab of the other of the electrode assemblies are at least partially overlapped in the axial direction.

6. The secondary battery according to claim 5, wherein each of the electrode assemblies comprises two electrode units that each comprises a sub-end face and a sub-pole tab extending from the sub-end face, two sub-end faces on the same side form one of the end faces, two sub-pole tabs with the same polarity converge to form the pole tab, and the sub-pole tab of one electrode unit extends out of an area of the sub-end face close to the other electrode unit in the axial direction.

7. The secondary battery according to claim 6, wherein the pole tab extends out of an area of the end face close to adjacent two wide surfaces of the two electrode units.

8. A battery module comprising two or more secondary batteries, wherein the two or more secondary batteries are disposed side by side, wherein each of the two or more secondary batteries comprises:
    a housing comprising a receiving hole with an opening;
    a top cover assembly hermetically connected with the housing to close the opening;
    an electrode assembly disposed in the receiving hole, and comprising two end faces located on two sides of the electrode assembly and opposite to each other in a first direction perpendicular to an axial direction of the receiving hole, wherein for an end face selected from the two end faces, the end face comprises a first area and a second area, and a pole tab extending out of the first area of the end face, wherein the electrode assembly comprises two or more electrode units stacked along the axial direction, and along a second direction perpendicular to the axial direction and the first direction, a size of the pole tab is smaller than a size of the end face; and
    a current collector comprising a main body, wherein the main body is configured to be substantially parallel to the end face, and be at least partially located between the second area of the end face and the housing, and the main body is further configured to extend along the axial direction, be electrically connected with the pole tab, and at least partially overlap with the pole tab along the second direction, wherein each of the electrode units comprises two wide surfaces and two narrow surfaces connecting the two wide surfaces, the two wide surfaces are opposed to each other in the axial direction, and one of the wide surfaces and one of the narrow surfaces are alternately disposed, the two narrow surfaces are arranged opposite to each other in the second direction, the opening of the housing is located at an end of the receiving hole in the axial direction, the current collector further comprises a transition portion and a current collecting sheet electrically connected with the main body, the transition portion is substantially parallel to the end face, extends along the second direction between the first area of the end face and the housing, the current collecting sheet is connected to an edge of the transition portion along the axial direction, wherein the current collecting sheet is configured to be connected and fixed with the pole tab, the transition portion, the current collecting sheet and the pole tab are located on the same side of the main body in the second direction, the current collecting sheet is foldable and is substantially parallel to the transition portion after folding, and the pole tab which has been bent along the first direction is connected and fixed to a surface of the current collecting sheet which has been bent away from the end face of the electrode assembly toward the transition portion.

9. The battery module according to claim 8, wherein the second area is located on one side of the first area in the second direction.

10. The battery module according to claim 9, wherein a sum of a size of the main body and the size of the pole tab is smaller than the size of the end face in the second direction.

11. The battery module according to claim 9, wherein the end face further comprises a third area located on the other side of the first area in the second direction, and a size of the third area is smaller than a size of the second area.

* * * * *